(12) United States Patent
Kim

(10) Patent No.: US 7,079,871 B2
(45) Date of Patent: Jul. 18, 2006

(54) PORTABLE TELEPHONE AND METHOD OF DISPLAYING DATA THEREOF

(75) Inventor: Pyung-soo Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 551 days.

(21) Appl. No.: 10/347,223

(22) Filed: Jan. 21, 2003

(65) Prior Publication Data

US 2003/0139206 A1 Jul. 24, 2003

(30) Foreign Application Priority Data

Jan. 21, 2002 (KR) ................................ 2002-3284

(51) Int. Cl.
*H04M 1/00* (2006.01)
*G09G 5/00* (2006.01)
*G06F 3/00* (2006.01)

(52) U.S. Cl. ...................... 455/566; 455/550; 345/1.1; 345/1.2; 715/864; 715/761; 715/793

(58) Field of Classification Search ................ 455/566, 455/550, 90.1, 90.2, 78, 466, 414.1; 345/1.1, 345/1.2, 1.3; 715/864, 865, 866, 526, 751, 715/758, 761, 793, 961, FOR. 183
See application file for complete search history.

(56) References Cited

U.S. PATENT DOCUMENTS

| | | | | |
|---|---|---|---|---|
| 5,327,479 | A * | 7/1994 | Engelke et al. ................ | 379/52 |
| 5,841,431 | A * | 11/1998 | Simmers ...................... | 345/211 |
| 5,905,476 | A * | 5/1999 | McLaughlin et al. ........ | 715/781 |
| 5,956,021 | A * | 9/1999 | Kubota et al. ............... | 345/179 |
| 6,069,648 | A * | 5/2000 | Suso et al. ................. | 348/14.02 |
| 6,173,194 | B1 * | 1/2001 | Vanttila ....................... | 455/566 |
| 6,771,974 | B1 * | 8/2004 | Sim et al. .................... | 455/466 |
| 6,819,268 | B1 * | 11/2004 | Wakamatsu et al. ......... | 340/988 |
| 6,850,781 | B1 * | 2/2005 | Goto ........................... | 455/566 |
| 2002/0065111 | A1 * | 5/2002 | Otsuka et al. ............... | 455/566 |
| 2003/0013439 | A1 * | 1/2003 | Daniel et al. ................ | 455/422 |
| 2003/0078077 | A1 * | 4/2003 | Kokubo ....................... | 455/566 |

FOREIGN PATENT DOCUMENTS

| CN | 1279571 | 1/2001 |
|---|---|---|
| JP | 11-355847 | 12/1999 |

(Continued)

OTHER PUBLICATIONS

Chinese Office Action for 021559694.
Office Action issued by Japanese Patent Office Sep. 13, 2005.

*Primary Examiner*—Duc M. Nguyen
(74) *Attorney, Agent, or Firm*—Staas & Halsey LLP

(57) ABSTRACT

A data displaying method includes, when a user draws up character messages to be transmitted, the character messages to be transmitted are displayed on one display window. If a window division function is selected, after determining what kind of function is selected, the display window into two display windows, and then the character messages being drawn up are displayed on one of the two divided display windows and data corresponding to the selected function is displayed on the other display window. As a result, the user can carry out another telephone function without losing the character messages being drawn up while drawing up the character messages to be transmitted. Also, the user can carry out smooth communications using character messages.

26 Claims, 10 Drawing Sheets

FOREIGN PATENT DOCUMENTS

| | | |
|---|---|---|
| JP | 200-278751 | 10/2000 |
| JP | 2000-307730 | 11/2000 |
| JP | 2001-189783 | 7/2001 |
| JP | 2001-282204 | 10/2001 |
| JP | 2001-285445 | 10/2001 |
| JP | 2002-171317 | 6/2002 |
| JP | 2002-183049 * | 6/2002 |
| JP | 2003-087366 | 3/2003 |
| JP | 2003-209609 | 7/2003 |
| JP | 2003-274004 | 9/2003 |

* cited by examiner

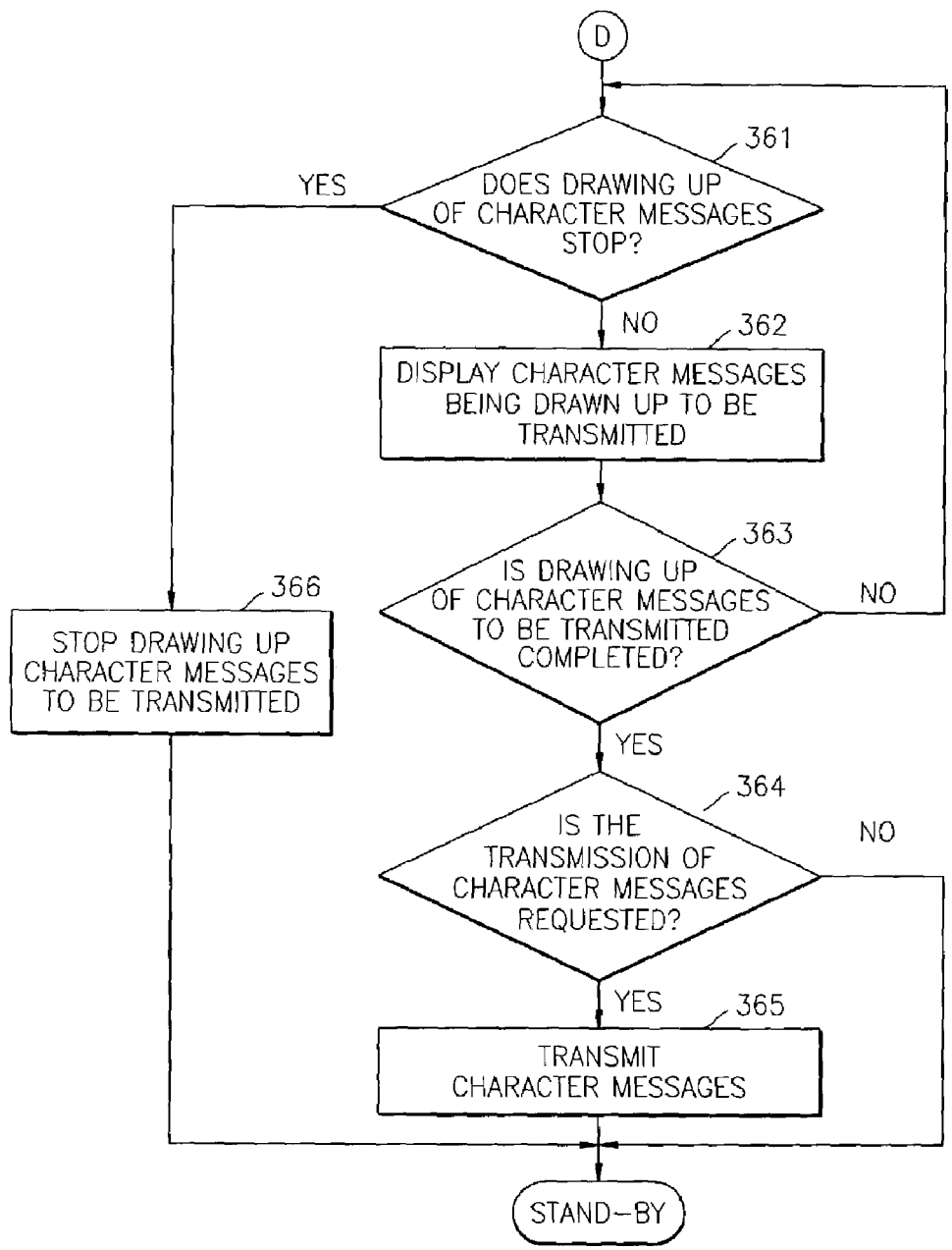

FIG. 9A (PRIOR ART)

B! I... NOW AT THE FRONT GATE OF JONGRO BOOKSTORE.

FIG. 9B (PRIOR ART)

A! I AM NOW AT THE FRONT GATE OF JONGRO BOOKSTORE.

FIG. 9C (PRIOR ART)

"ARRIVAL OF CHARACTERS"

B! I... NOW AT THE FRONT GATE OF JONGRO BOOKSTORE.

FIG. 9D (PRIOR ART)

"ARRIVAL OF CHARACTERS"

A! I AM NOW AT THE FRONT GATE OF JONGRO BOOKSTORE. WHERE ARE YOU NOW?

FIG. 9E (PRIOR ART)

[RECEIVED MESSAGES]

A! I AM NOW AT THE FRONT GATE OF JONGRO BOOKSTORE.

FIG. 9F (PRIOR ART)

I TOLD YOU THE EAST GATE OF JONGRO BOOKSTORE!!

FIG. 9G (PRIOR ART)

THERE'S A TELEPHONE CALL FOR YOU 123-456-7890

FIG. 9H (PRIOR ART)

TELEPHONE NUMBER SEARCH

C: 011-111-2222
D: 016-222-3333
E: 018-333-4444

PORTABLE TELEPHONE AND METHOD OF DISPLAYING DATA THEREOF

CROSS-REFERENCE TO RELATED APPLICATION

This application claims the benefit of Korean Patent Application No. 2002-3284, filed Jan. 21, 2002 in the Korean Intellectual Property Office, the disclosure of which is incorporated herein in its entirety by reference.

BACKGROUND OF THE INVENTION

1. Field of the Invention

The present invention relates to a portable telephone, and more particularly, to a portable telephone having a window division function when drawing up character messages to be transmitted and a telephone data displaying method.

2. Description of the Related Art

Portable telephones provide two-way communication with another subscriber via a general wireless communication network. Further, the user classes for portable telephones have been gradually extended. In particular, character communications via the transmission and reception of character messages have been generally increased.

FIGS. 9A through 9F show successive screens displaying character messages according to a conventional method in which a user is transmitting and receiving character messages to and from another party using a portable telephone. While a user is drawing up first character messages on one display window to be transmitted to another party as shown in FIG. 9A, the other party transmits to the user second character messages drawn up as shown in FIG. 9B. Then, the reception of the second character messages from the other party is displayed on the display window of the user's portable telephone as shown in FIG. 9C. If the user is trying to check the received second character messages before finishing drawing up the first character messages to be transmitted, the user loses the first character messages being drawn up.

However, after the user finishes drawing up the first character messages to be transmitted as shown in FIG. 9D and transmits the first character messages, the user can see the received second character messages as shown in FIG. 9E. In the first case, since the other party determines that the user failed to receive the transmitted second character messages, the other party draws up other character messages and retransmits the new other character messages as shown in FIG. 9F. Accordingly, communications using character messages cannot be smoothly carried out, and wrong, unnecessary, and confusing character messages may be sent.

FIG. 9G shows a screen displaying a request for call setting while the user is drawing up the first character messages to be transmitted. When an incoming call setting is requested as shown in FIG. 9G, call setting request phrases and the incoming call telephone number are displayed. If the user responds to the request for the call setting, the user loses the first character messages being drawn up. Thus, the user has to re-draft the first character messages to be transmitted after a telephone call.

FIG. 9H shows a screen displaying other functions, such as telephone number search, etc., that the user may carry out while the user is drawing up the first character messages to be sent. When a telephone number search function is selected as shown in FIG. 9H, searched contents are displayed on the screen and the unfinished first character messages to be transmitted are deleted. Therefore, after the search function is completed, the first character messages to be transmitted have to be recreated.

The above-described data displaying method of the conventional portable telephone will be summarized below using FIG. 10. Referring to FIG. 10, in operation 210, character messages being drawn up to be sent are displayed on one display window. In operation 220, it is determined whether an input function is selected. If it is determined that the input function is not selected, in operation 230, the character messages being drawn up to be transmitted are displayed and the completed character messages are transmitted. If it is determined that the input function is selected, in operation 240, it is checked what kind of input function is selected. In operation 250, a function corresponding to the selected input function is carried out.

As described above, according to the conventional data displaying method, communications via character messages are not smoothly carried out. Also, when a user responds to a request for call setting while the user is drawing up character messages to be transmitted, and carries out another function, the loss of data being drawn up is unavoidable.

SUMMARY OF THE INVENTION

To solve the above-described and/or other problems, it is an aspect of the present invention to provide a portable telephone which is capable of efficiently displaying character messages to be transmitted when drawing up the character messages to be transmitted, and a telephone data displaying method.

It is another aspect of the present invention to provide a portable telephone which is capable of preserving character messages to be transmitted when responding to a call setting requested while drawing up character messages to be transmitted, and a telephone data displaying method.

It is still another aspect of the present invention to provide a portable telephone which is capable of preserving character messages being drawn up when carrying out another telephone function, such as a telephone number search function, while drawing up the character messages to be transmitted, and a telephone data displaying method.

Additional aspects and advantages of the invention will be set forth in part in the description which follows and, in part, will be obvious from the description, or may be learned by practice of the invention.

Accordingly, to achieve the above and/or other aspects of the invention, according to an aspect of the present invention, there is provided a portable telephone including an inputting unit which receives first character messages to be transmitted, a wireless transceiver which receives character messages and transmits completed character messages, a data storage unit which stores data including the transmitted completed character messages and the received character messages, a display having a display window which displays the data of the data storage unit, and, when second character messages are received using the wireless transceiver while the first character messages to be transmitted are being drawn up, a controller displays the arrival of the received second character messages on the display window, determines whether a user selects the received second character messages, and if it is determined that the user selects the received second character messages, divides the display window into first and second display windows, and displays the first character messages to be transmitted on the first display window and the received second character messages on the second display window.

According to another aspect of the present invention, there is provided a portable telephone including an inputting unit, a wireless transceiver, a data storage unit, a display, and a controller, where the inputting unit receives first character messages to be transmitted, the wireless transceiver receives a call setting request, the data storage unit stores data including the first character messages and a call setting request telephone number, the display has a display window displaying the data of the data storage unit, and the controller divides the display window into first and second display windows, displays the first character messages to be transmitted on the first display window, and displays the call setting telephone number on the second display window if a call setting request is input using the wireless transceiver while drawing up the first character messages to be transmitted.

According to still another aspect of the present invention, there is provided a portable telephone including an inputting unit, a wireless transceiver, a data storage unit, a display, and a controller, where the inputting unit receives first character messages to be transmitted and a division mode selection, the wireless transceiver transmits completed character messages if the completed character messages are to be transmitted, the data storage unit stores data including the first character messages to be transmitted, the display has a display window displaying the first character messages to be transmitted, and the controller divides the display window into first and second display windows, displays the first character messages to be transmitted on the first display window and displays a search type selection screen on the second display window if the division mode selection is input using the inputting unit while drawing up the first character messages to be transmitted.

According to a still further aspect of the present invention, there is provided a portable telephone data displaying method in which character messages are drawn up to be transmitted are displayed on one display window, it is determined whether a window division function for dividing the display window is selected, and if it is determined that the window division function is selected, it is determined what kind of function is selected, the display window is divided into first and second windows, the character messages to be transmitted are displayed on the first display window, and data corresponding to the selected function are displayed on the second display window.

BRIEF DESCRIPTION OF THE DRAWINGS

The above and/or other aspects and advantages of the present invention will become more apparent by describing in detail embodiments thereof with reference to the accompanying drawings in which:

FIGS. 4 through 8 are flowcharts explaining, in detail, the telephone data displaying method according to other embodiments of the present invention;

FIGS. 9A through 9H are views illustrating successive telephone screens displaying data using a conventional data displaying method of a portable telephone.

DETAILED DESCRIPTION OF THE EMBODIMENTS

Figure 1:
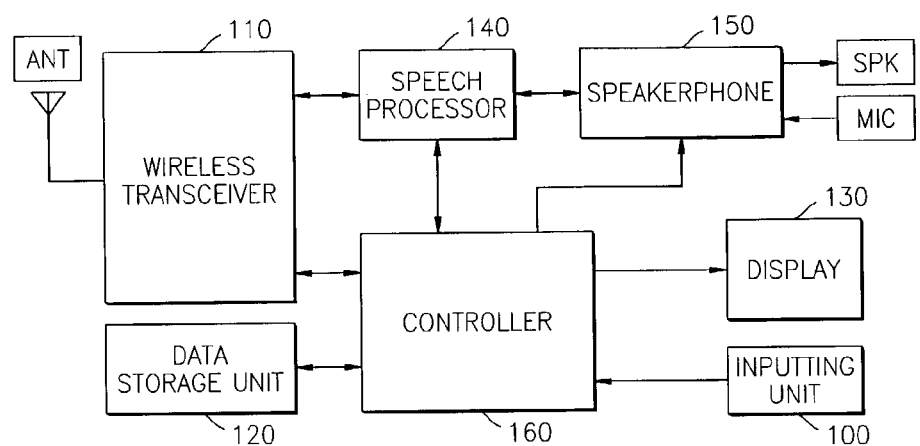
FIG. 1 is a block diagram of a portable telephone according to an embodiment of the present invention.

Hereinafter, embodiments of the present invention will be described with reference to the accompanying drawings, examples of which are illustrated in the accompanying drawings, wherein like reference numerals refer to the like elements throughout. The embodiments are described below in order to explain the present invention by referring to the figures.

FIG. 1 is a block diagram of a portable telephone according to an embodiment of the present invention. Referring to FIG. 1, the portable telephone includes an inputting unit 100, a wireless transceiver 110, a data storage unit 120, a display 130, a speech processor 140, a speakerphone 150, and a controller 160. The inputting unit 100 inputs non-transmitted character messages to be transmitted to another party. The wireless transceiver 110 transmits and receives character messages using an antenna ANT. The data storage unit 120 stores the transmitted character messages and the received character messages. The display 130 displays the non-transmitted character messages to be transmitted and the received character messages. The speech processor 140 processes speech data received using the wireless transceiver 110, and then transmits the speech data to a speaker SPK using the speakerphone 150. Also, the speech processor 140 receives speech data from a microphone MIC using the speakerphone 150, processes the speech data, and then forwards the speech data to the wireless transceiver 110.

The controller 160 draws up the untransmitted character messages to be transmitted based on data input from a user using the inputting unit 100. The controller 160 displays the arriving character message on the display 130 when the character messages are received while drawing up the untransmitted character messages. At this time, if the user selects to check the received character message, the controller 160 divides a display window of the display 130 into two screens. The controller 160 displays the untransmitted character messages being drawn up on one of the two divided screens, and the received character messages on the other of the two divided screens. While not required in all aspects of the invention, it is understood that the controller 160 can be implemented using a general or special purpose computer.

In a portable telephone according to another embodiment of the present invention, the inputting unit 100 inputs the untransmitted character messages to be transmitted to another party. The wireless transceiver 110 receives a request for call setting using the antenna ANT. The data storage unit 120 stores the transmitted character messages and the received call setting request telephone numbers. The display 130 displays the character messages to be transmitted, the call setting request telephone numbers, and the call setting request notifications. The speech processor 140 processes the speech data received using the wireless transceiver 110, and transmits the speech data to the speaker SPK using the speakerphone 150. Also, the speech processor 140 receives speech data from the microphone MIC via the speakerphone 150, processes the received speech data, and transmits the speech data to the wireless transceiver 110. The controller 160 receives data from the inputting unit 100 to draw up character messages to be transmitted, and divides the display window of the display 130 into two display windows. The character messages being drawn up are displayed on one of the two divided display windows, and the call setting request telephone numbers are displayed on the other of the two divided display windows, when the call setting is requested while drawing up the character messages.

In a portable telephone according to still another embodiment of the present invention, the inputting unit 100 inputs character messages to be transmitted and a division mode selection. The wireless transceiver 110 transmits completed character messages using the antenna ANT. The data storage unit 120 stores the transmitted character messages, and the display 130 displays the character messages to be transmitted. The speech processor 140 processes speech data received using the wireless transceiver 110 and transmits the speech data to the speaker SPK using the speakerphone 150. Also, the speech processor 140 receives the speech data from the microphone MIC via the speakerphone 150, processes the speech data, and transmits the speech data to the wireless transceiver 110. The controller 160 receives data from the inputting unit 100 to draw up the character messages to be transmitted, and divides the display window of the display 130 into two display windows. The character messages being drawn up are displayed on one of the two divided display windows and a search type selection screen is displayed on the other of the two divided display windows when the division mode selection is input via the inputting unit 100 while drawing up the character messages to be transmitted. While the division mode is described in terms of a search type selection, it is understood that the division mode could be implemented in order to implement other functions of the portable telephone which require display of data to a user, such as system settings, games, or other functions associated with the operation of portable telephones.

Figure 2A:
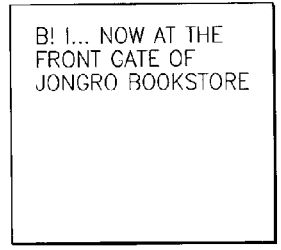
FIGS. 2A through 2H are views illustrating successive telephone screens displaying data using a data displaying method performed in the portable telephone according to an embodiment of the present invention.
Figure 2B:
Figure 2C:
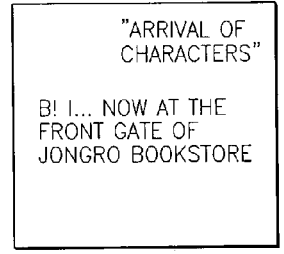
Figure 2D:
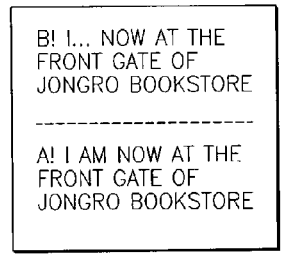

FIGS. 2A through H show successive screens displaying the state of data on the display 130 of the portable telephone according to the above-described embodiments of the present invention. FIGS. 2A through 2D show successive screens displayed in a portable telephone of FIG. 1. While a user is drawing up first character messages on one display window to be transmitted to another party as shown in FIG. 2A, the other party is drawing up and transmitting the second character messages as shown in FIG. 2B. Then, the message indicating the arrival of second character messages is displayed on the display window of the user's portable telephone as shown in FIG. 2C. When the user selects to view the received second character messages, the display window of the display 130 is divided into two. The first character messages being drawn up are displayed on one of the two divided display windows, and the second character messages received from the other party on the other of the two divided display windows as shown in FIG. 2D. As a result, the user can check the received second character messages, revise drawn up first character messages to answer or otherwise reflect the received second character messages, and transmit the revised first character messages.

Figure 2E:
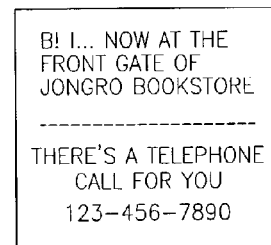
Figure 2F:
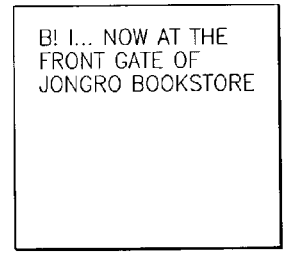

FIG. 2E shows a display screen of a portable telephone according to another embodiment of the present invention. When a call setting is requested while drawing up character messages to be transmitted, a display window of the display 130 is divided into two display windows. The character messages being drawn up are displayed on one of the two divided display windows and a call setting request telephone number and a notification on the other as shown in FIG. 2E. Here, when the user selects a response to the call setting request, the character messages being drawn up are stored. After the telephonic communication is completed, the two divided display windows are recombined to form a united display window. The stored character messages are redisplayed on the united display window to continue drawing up the character messages to be transmitted as shown in FIG. 2F. Thus, the user does not lose the character messages being drawn up.

Figure 2G:
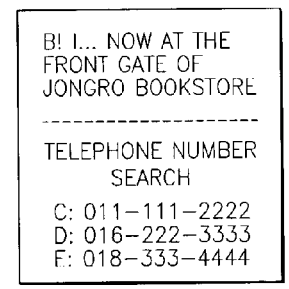
Figure 2H:
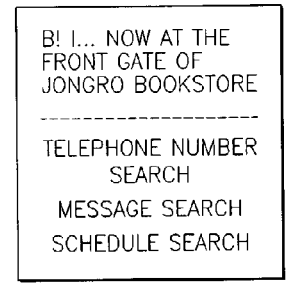

FIGS. 2G and 2H show successive display screens of a portable telephone of FIG. 1. When a user selects a division mode input to carry out a search function while drawing up character messages to be transmitted, a display window of the display 130 is divided into two display windows. The character messages being drawn up are displayed on one of the two divided display windows and a search type menu on the other of the two divided display windows as shown in FIG. 2G. For example, when the user selects a function of searching a telephone number as shown in FIG. 2H, a telephone number search screen is displayed on the display window on which the search type menu was displayed. The user can search the telephone number on the telephone number search screen. After finishing the search for the telephone number, the two divided display windows are recombined to form a united display window, and the user can complete the character messages being drawn up on the united display window shown in FIG. 2F.

Figure 3:
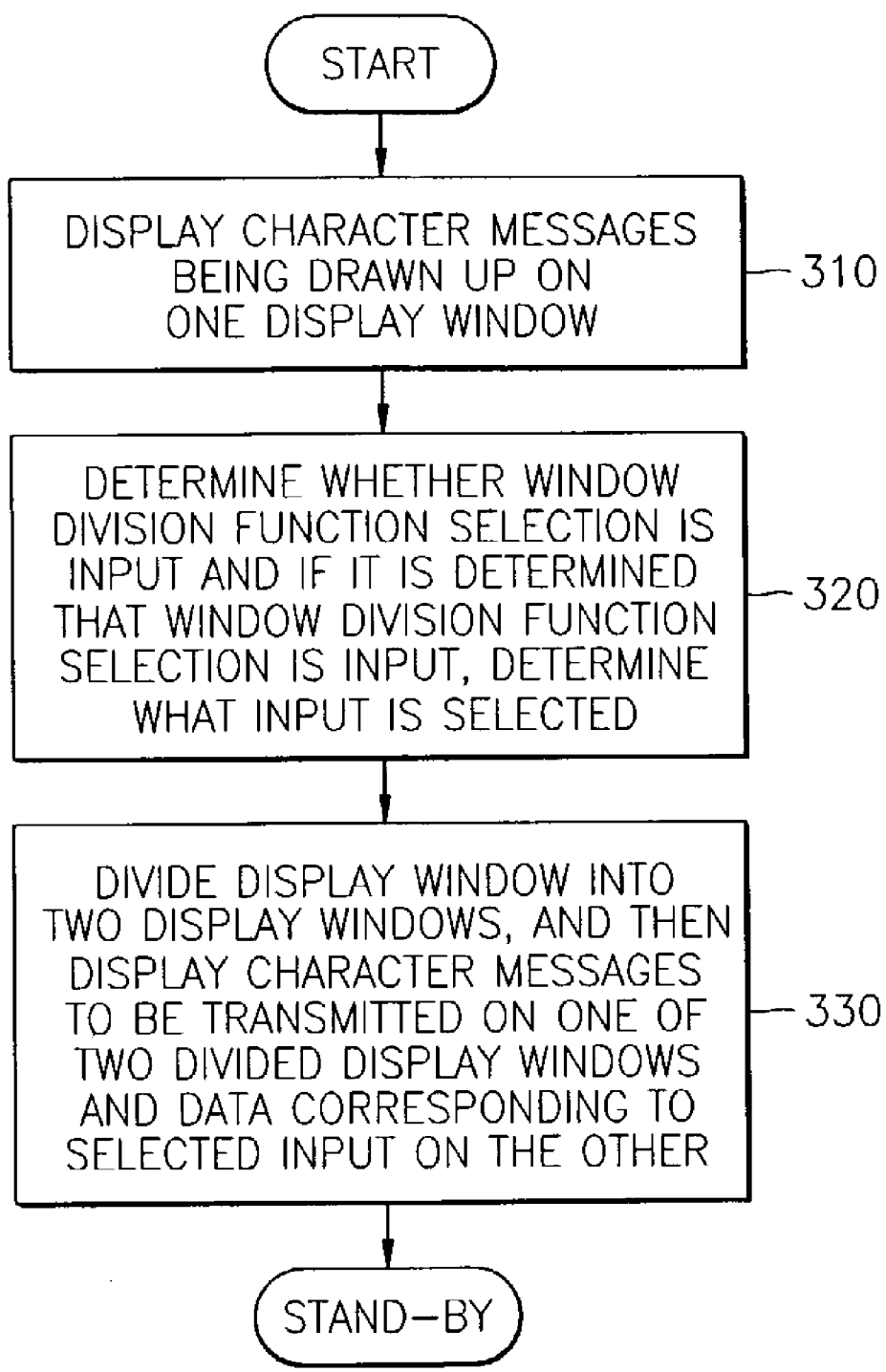
FIG. 3 is a flowchart briefly explaining the data displaying method performed in the portable telephone according to an embodiment of the present invention.

FIG. 3 is a flowchart briefly explaining a data displaying method for use with a portable telephone according to an embodiment of the present invention. Referring to FIG. 3, when a user selects a function of transmitting and receiving character messages, the controller 160 displays character messages being drawn up by the user on one input display window (operation 310). In operation 320, the controller 160 checks whether character messages or a call setting request are or is received from an external wireless communication network or a window division function due to a user's division mode selection being input, and if it is determined that the window division function is input, the controller determines what input is selected. In operation 330, the display window is divided into two display windows: the character messages being drawn up are displayed on one of the two divided display windows, and data corresponding to the selected input are displayed on the other of the two divided windows.

FIGS. 4 through 8 are flowcharts respectively explaining, in detail, a data displaying method of FIG. 3 according to other embodiments of the present invention. A portable telephone and a data displaying method thereof according to the above-described embodiments of the present invention will be described in detail with reference to FIGS. 4 through 8. It is understood that the methods of FIGS. 3 through 8 may be implemented by software encoded on a computer readable medium for use by the controller 160.

Figure 4:
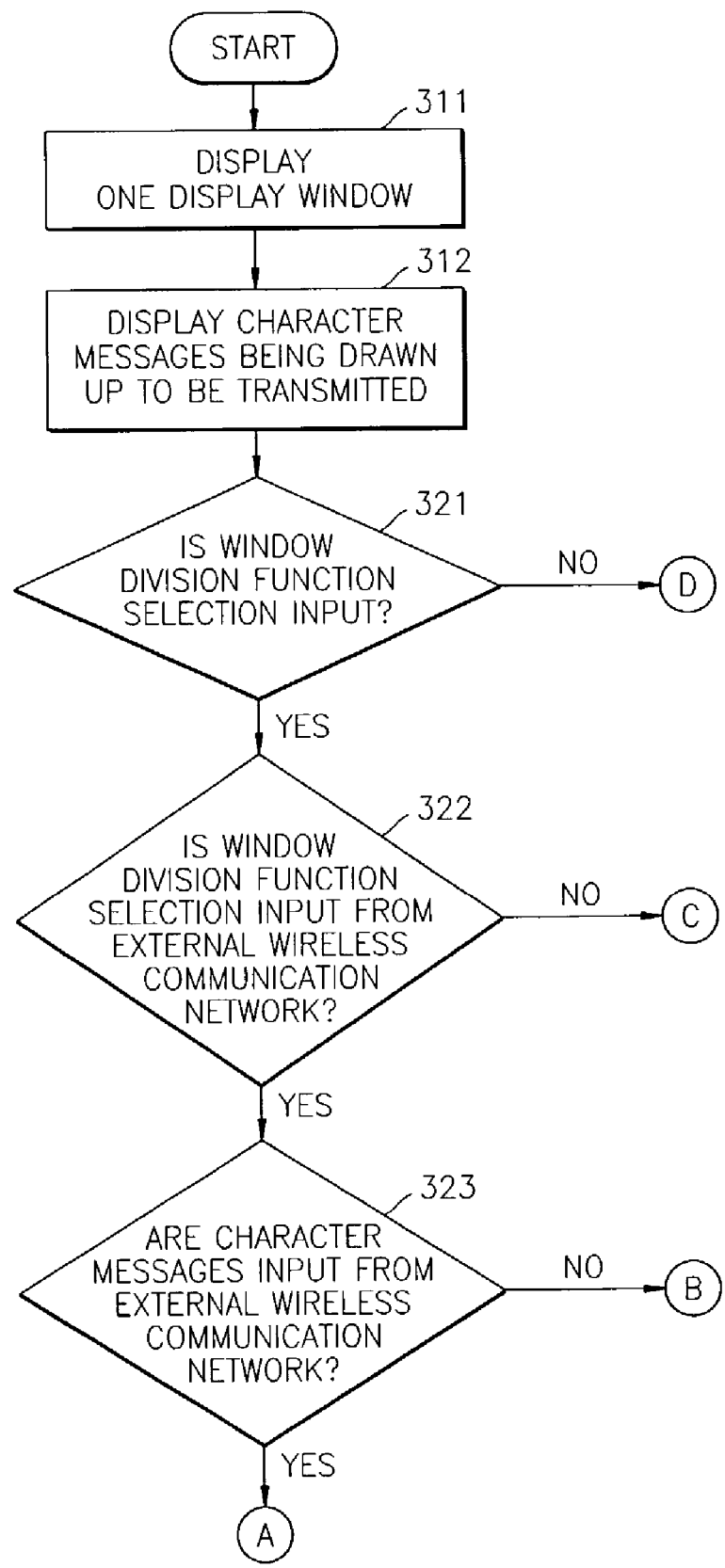

Referring to FIG. 4, when a user wants to draw up character messages using a portable telephone, the user selects a character message function using the inputting unit 100. In operation 311, the controller 160 recognizes the character message function and displays one display window on the display 130. In operation 312, the user draws up character messages to be transmitted using the inputting unit 100, and the controller 160 displays the character messages to be transmitted on the display window of the display 130 as shown in FIG. 2A. In operation 321, the controller 160 determines whether a window division function selection for dividing the display window of the display 130 is input. If it is determined that the window division function selection is input, in operation 322, it is determined whether the window division function selection is input from an external wireless communication network. If it is determined that the window division function selection is not input from the external wireless communication network, in operation 322, the controller 160 determines that the user selects a division mode, and processes operation C shown in FIG. 7.

If it is determined that the window division function selection is input from the external wireless communication network in operation 322, the controller 160 determines whether character messages are input from the external wireless communication network in operation 323. If it is determined that the character messages are not input from the external wireless communication network, the controller 160 performs operation B of processing a call setting request shown in FIG. 6. In contrast, if it is determined that the character messages are input from the external wireless communication network, the controller 160 performs operation A shown in FIG. 5.

Figure 5:
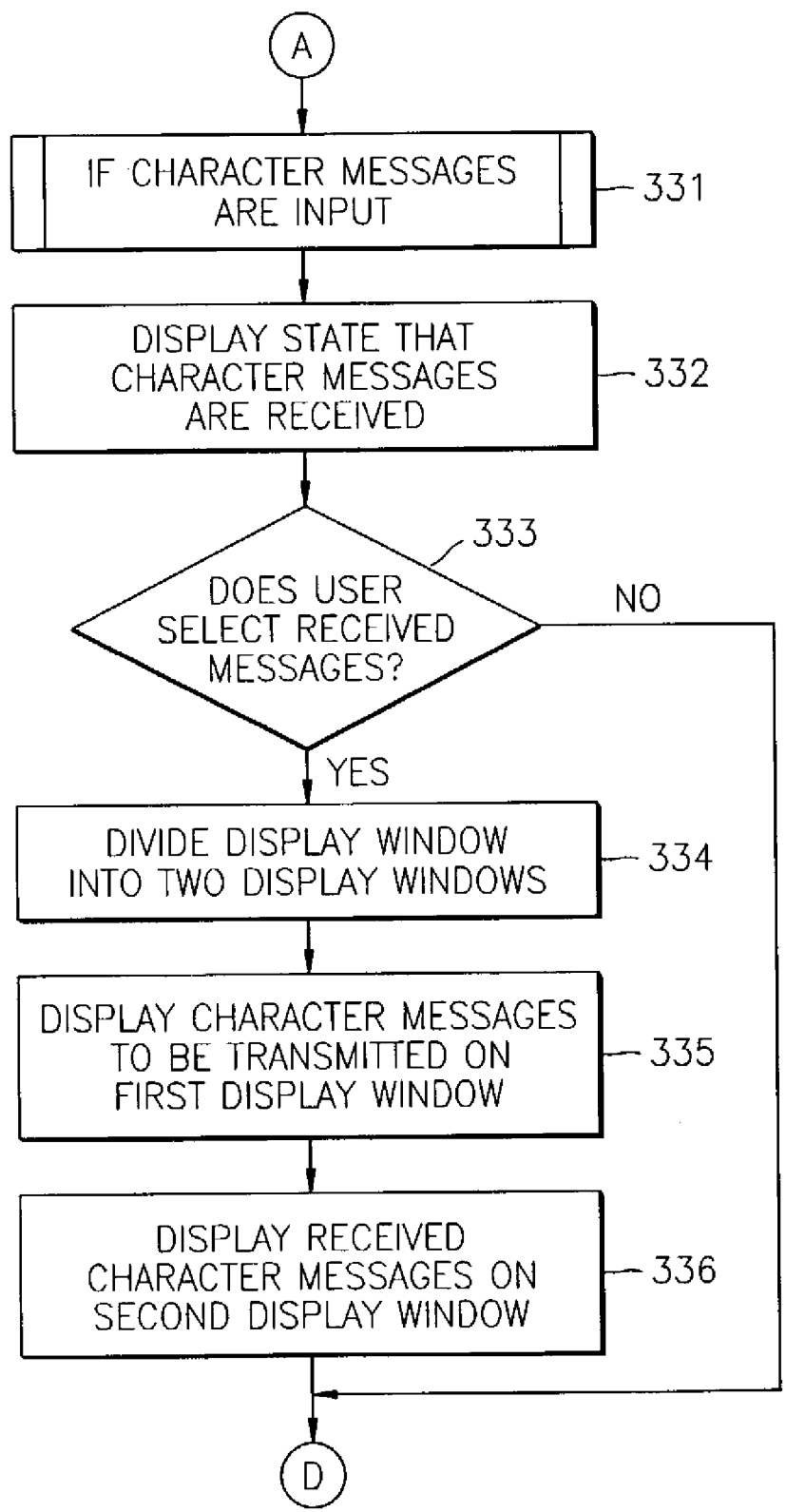

FIG. 5 is a flowchart explaining a data displaying method of a portable telephone according to an embodiment of the present invention. Referring to FIG. 5, if it is determined in operation 331 that the character messages are input from the external wireless communication network, the controller 160 displays the state of the received character messages on a portion of the display window of the display 130 as shown in FIG. 2C in order to inform the user that the character messages are received (operation 332). It is understood that operation 332 need not be performed in all aspects of the invention. Further, it is understood that other mechanisms can be used to inform the user, such as sounds and vibrations, instead of or in addition to display a message.

In operation 333, the controller 160 determines whether the user selects to view the received character messages. If it is determined that the user does not select to view the received character messages, the controller 160 displays the character messages being drawn up to be transmitted and processes operation D shown in FIG. 8. If it is determined that the user selects to view the received character messages, as shown in FIG. 2D, in operation 334, the display window of the display 130 is divided into first and second display windows. In operation 335, the character messages being drawn up are displayed on the first one of the two divided display windows. In operation 336, the received character messages are displayed on the second display window. Then, the user can check the received character messages displayed on the second display window to determine whether to continue drawing up the character messages to be transmitted, to revise the character messages, or to stop drawing up the character messages. As a result, inappropriate and confusing character messages as shown in FIGS. 9A through 9F are not transmitted so as to achieve smooth communications using the character messages.

Figure 6:
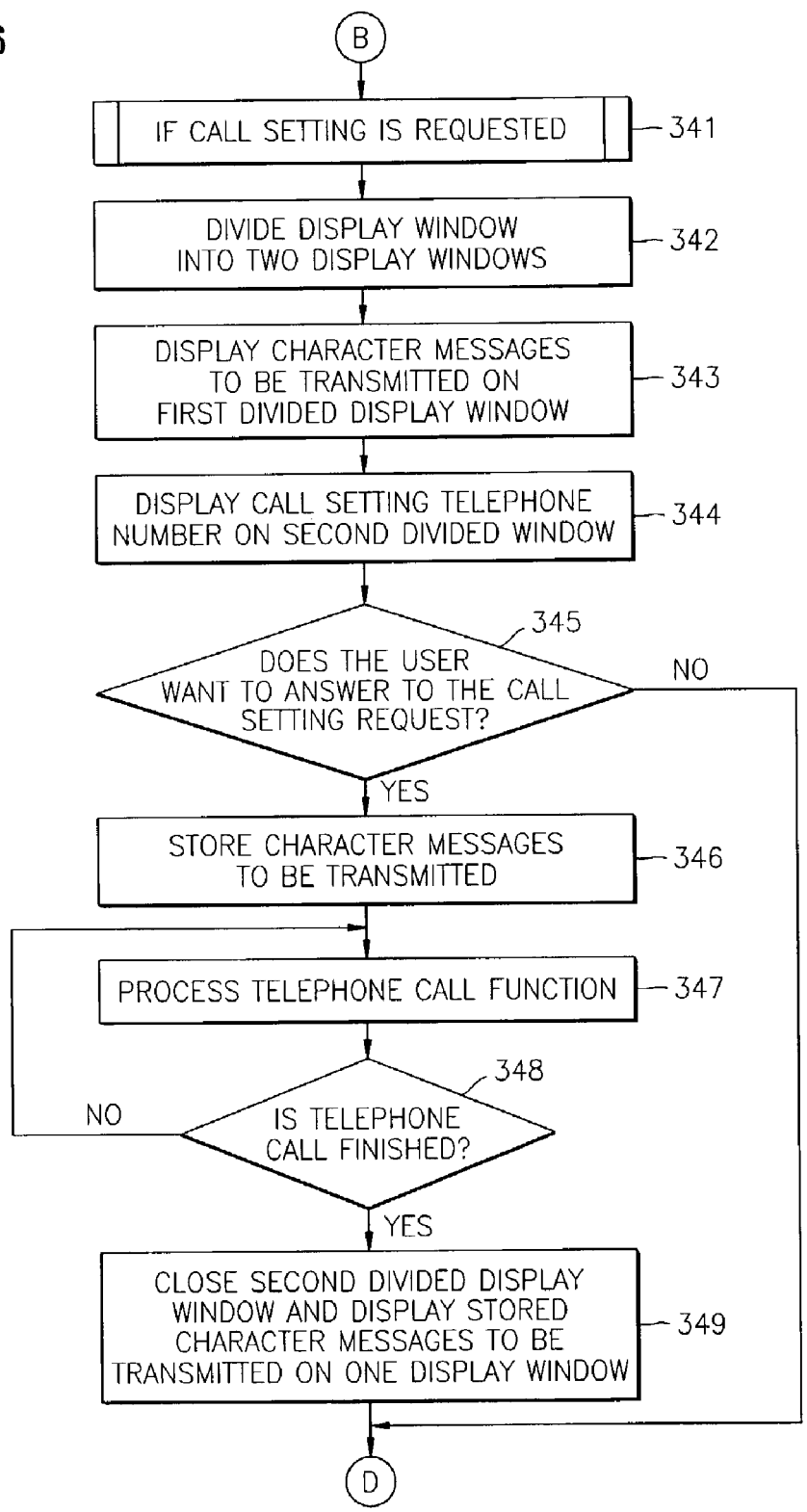

FIG. 6 is a flowchart explaining a data displaying method of a portable telephone according to another embodiment of the present invention. Referring to FIG. 6, in operation 341, if the controller 160 determines that selection input is a call setting request, as shown in FIG. 2E, the display window of the display 130 is divided into first and second display windows (operation 342). In operation 343, the character messages being drawn up to be transmitted are displayed on the first divided display window. In operation 344, a call setting request notification and a call setting telephone number are displayed on the second divided display window. In operation 345, the controller 160 determines whether the user selects to answer the call setting request. If it is determined that the user does not select to answer the call setting request, the controller 160 continues displaying the character messages being drawn up by going to operation D. If it is determined that the user selects to answer the call setting request, the controller 160 stores the character messages being drawn up in a predetermined area of the data storage unit 120 (operation 346).

In operation 347, the controller 160 controls the wireless transceiver 110, the speech processor 140, and the speakerphone 150 to process a telephone call function so that the user responds to the call setting request. In operation 348, the controller 160 determines whether the telephone call is finished. If it is determined that the telephone call is not finished, the controller 160 controls the telephone call. If it is determined that the telephone call is finished, in operation 349, the controller 160 closes the second divided display window to recombine the two divided display windows to form a united display window, and then displays on the united display window the character messages being drawn up and which were stored in the data storage unit 120.

Figure 7:
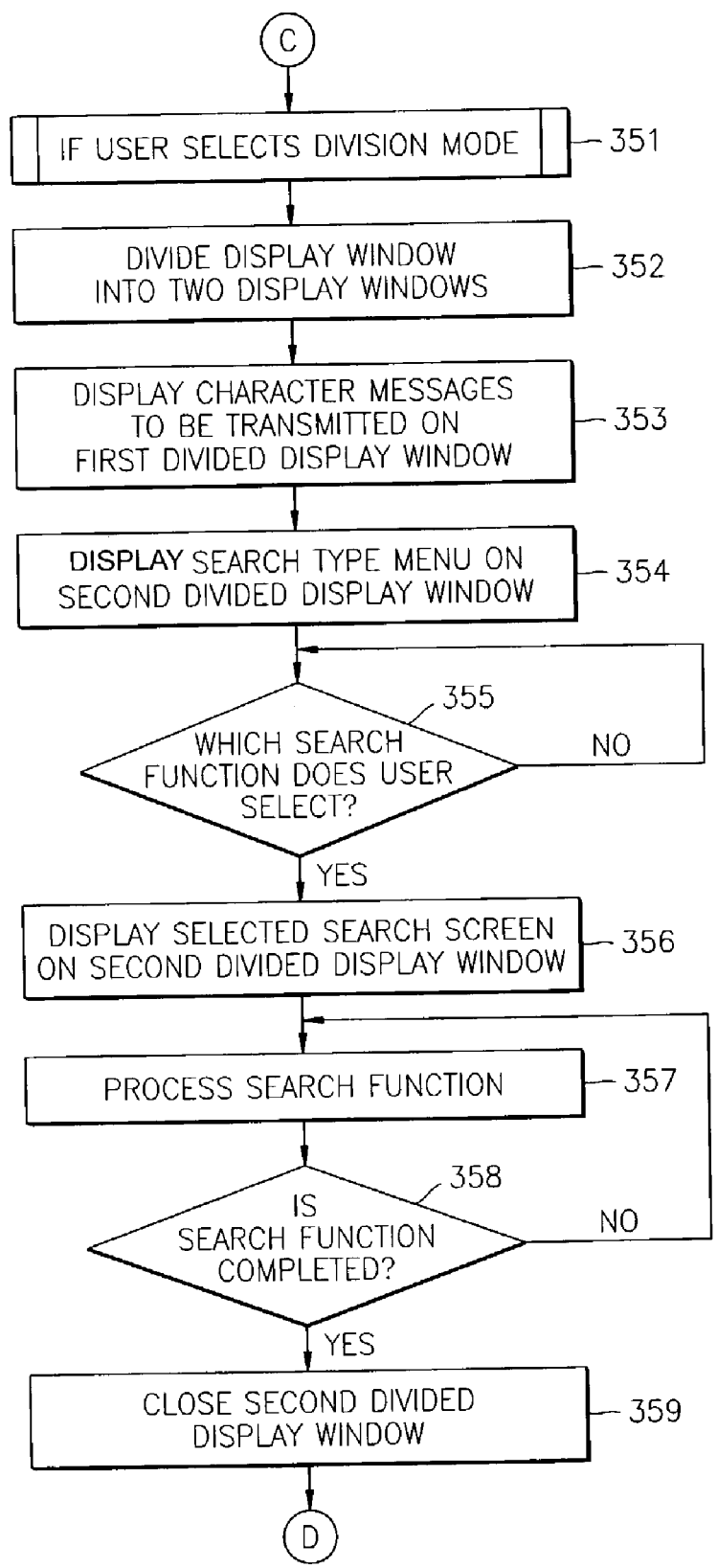
Figure 10:
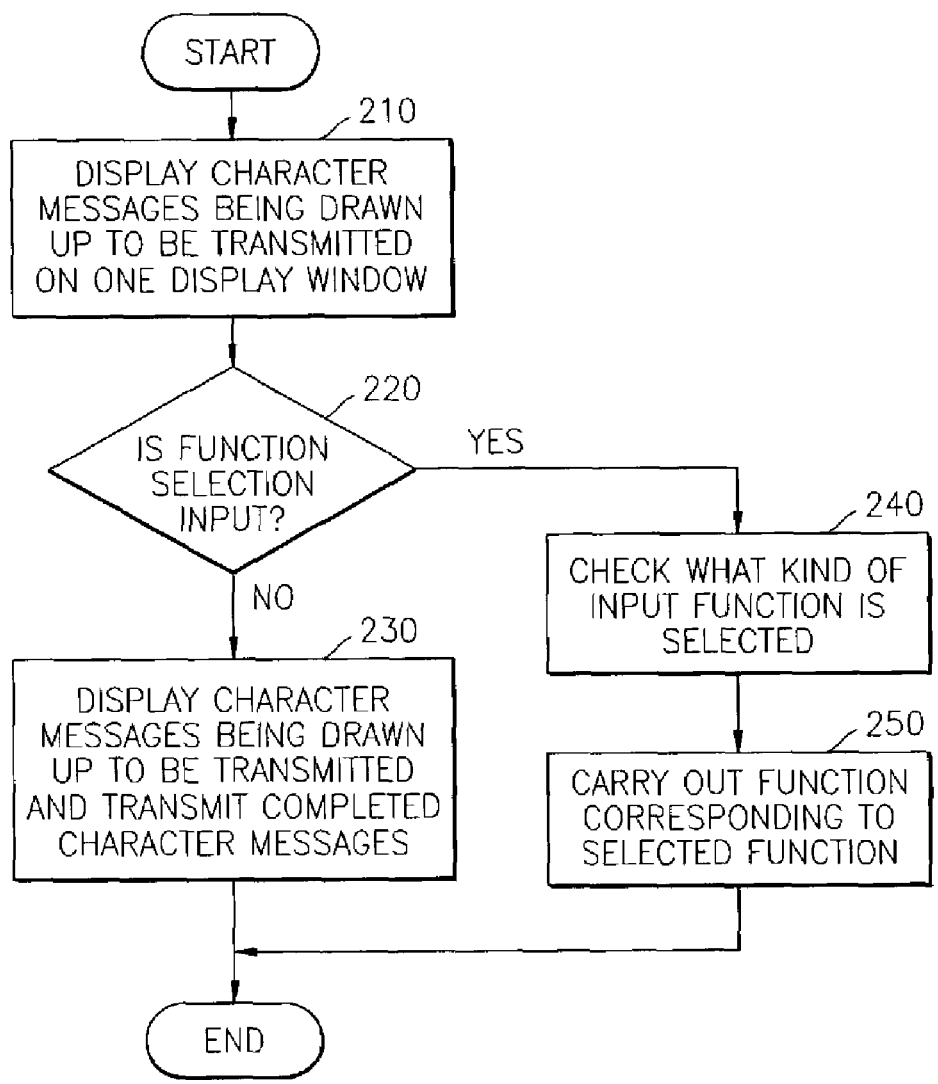
FIG. 10 is a flowchart explaining the conventional data displaying method of the portable telephone.

FIG. 7 is a flowchart explaining a data displaying method of a portable telephone according to still another embodiment of the present invention. Referring to FIG. 7, the user selects a division mode so as to use another search function, such as a telephone number search and the like, while drawing up character messages to be transmitted. In operation 351, if a window division function selection input is the user's division mode selection, as shown in FIG. 2G, the controller 160 divides the display window of the display 130 into first and second display windows (operation 352). In operation 353, the character messages being drawn up are displayed on the first divided display window. In operation 354, a search type menu screen is displayed on the second divided display window. In operation 355, the controller 160 waits for and determines which search function the user selects. In operation 356, a search screen corresponding to the user's selection is displayed on the second divided display window.

If the portable telephone has one kind of search function, operations 354 and 355 may be omitted to immediately display one search screen.

In operation 357, the controller 160 displays data corresponding to the user's selection on the second divided display window and processes the search function selected by the user. In operation 358, the controller 160 determines whether the search function is completed. If it is determined that the search function is not completed, the controller 160 continues carrying out the search function. If it is determined that the search function is completed, the controller 160 closes the second divided display window (operation 359), and then goes to operation 361 of drawing up character messages to be transmitted as shown in FIG. 8.

FIG. 8 is a flowchart explaining the data displaying method for completing drawing up character messages to be transmitted. The portable telephone according to the above-described embodiments of the present invention performs the data displaying method described with reference to FIGS. 6 through 7, and then performs a data displaying method for finishing drawing up character messages to be transmitted that will be described with reference to FIG. 8. In operation 361, the controller 160 determines whether the drawing up of character messages to be transmitted stops. If it is determined that the drawing up of the character messages does not stop, in operation 362, the controller 160 displays the character messaged being drawn up.

In operation 363, the controller 160 determines whether the drawing up of the character messages to be transmitted is completed. If it is determined that the drawing up of the character messages to be transmitted is not completed, the controller 160 repeats operations 361 through 363. If it is determined that the drawing up of the character messages to be transmitted is completed, the controller 160 determines whether the transmission of the completed character messages are requested (operation 364). If it is determined that the completed character messages are to be transmitted, the controller 160 transmits the completed character messages (operation 365). If it is determined that the character messages are not to be transmitted, the controller 160 stands by. If it is determined, in operation 361, that the drawing up of the character messages to be transmitted stops, in operation 366, the controller 160 stops drawing up the character messages to be transmitted, and then stands by.

As described above, according to the present invention for use in a portable telephone, a window division function selection is input while drawing up character messages to be transmitted, a display window is divided into two display windows, and then data corresponding to types of the selection input is respectively displayed on the two divided display windows. The method has the following and other advantages.

First, when communicating with the other party connected to a general wireless network by using character messages, character messages received while drawing up character messages to be transmitted can be checked in real-time. Thus, unnecessary character messages can be prevented from being drawn up and efficient communications can proceed.

Second, since another function can be carried out while character messages are being created, the time required for repeatedly drawing up the character messages to be transmitted can be saved.

Finally, a necessary search function can be simultaneously displayed when drawing up character messages to be transmitted. Thus, necessary data can be searched so as to be used for drawing up the character messages to be transmitted without stopping drawing up the character messages to be transmitted.

While described in terms of being used with a portable telephone, it is understood that the method could be used in other devices which transmit and receive messages, such as personal digital assistants and personal computers. It is also understood that the display window can be split into more than two display windows if multiple operations are performed at once. It is further understood that the method can be implemented using non-wireless telephones or other devices which communicate over systems having non-wireless components.

While this invention has been particularly shown and described with reference to embodiments thereof, it will be understood by those skilled in the art that various changes in form and details may be made therein without departing from the spirit and scope of the invention as defined by the accompanying claims and equivalents thereof.

What is claimed is:

1. A portable telephone comprising:
an inputting unit which receives first character messages to be transmitted;
a wireless transceiver which receives second character messages and transmits completed character messages;
a data storage unit which stores data including the transmitted character messages and the received second character messages;
a display having a display window which displays the data of the data storage unit; and
a controller which, if the second character messages are received using the wireless transceiver while drawing up the first character messages to be transmitted using the inputting unit:
displays the arrival of the received second character messages on the display window,
determines whether there is a selection to display the received second character messages,
if the determination is that the selection is to display the received second character messages, divides the display window into first and second display windows, displays the first character messages to be transmitted on the first display window, and displays the received second character messages on the second display window.

2. A portable telephone comprising:
an inputting unit which receives character messages to be transmitted;
a wireless transceiver which receives a call setting request;
a data storage unit which stores data including the character messages to be transmitted and a call setting request telephone number;
a display having a display window which displays the data of the data storage unit; and
a controller which, if the call setting request is input using the wireless transceiver while the character messages to be transmitted are being drawn up using the inputting unit, divides the display window into first and second display windows, displays the character messages to be transmitted on the first display window, and displays the call setting telephone number on the second display window.

3. The portable telephone of claim 2, wherein the controller determines whether a selection is made to answer the call setting request, and if the determination is that the selection is to answer the call setting request, stores the character messages to be transmitted and processes a telephone call function according to the call setting request.

4. The portable telephone of claim 3, wherein the controller determines whether the processing of the telephone call function is finished, and if the determination is that the processing of the telephone call function is finished, closes the second display window so as to recombine the first and second display windows to form a united display window, and displays the stored character messages to be transmitted on the united display window.

5. A portable telephone comprising:
an inputting unit which receives character messages to be transmitted and a division mode selection;
a wireless transceiver which, if the character messages to be transmitted are completed, transmits the completed character messages;
a data storage unit which stores the character messages to be transmitted;
a display having a display window which displays the character messages to be transmitted; and
a controller which, if the division mode selection is input using the inputting unit while the character messages to be transmitted are being drawn up, divides the display window into first and second display windows, displays the character messages to be transmitted on the first display window, and displays a search type selection screen on the second display window.

6. The portable telephone of claim 5, wherein the controller determines which search type is selected from the search type selection screen displayed on the second display window and displays a search screen corresponding to the selected search type.

7. The portable telephone of claim 6, wherein the controller determines whether a search is completed, and if the determination is that the search is completed, closes the second display window.

8. The portable telephone of claim 6, wherein the search screen is a telephone number search screen.

9. A portable telephone data displaying method comprising:
displaying character messages being drawn up to be transmitted on one display window;
determining whether a window division function for dividing the display window is selected; and
if the determination is that the window division function is selected:
determining what kind of function is selected,
dividing the one display window into first and second display windows,
displaying the character messages to be transmitted on the first display window, and
displaying data corresponding to the selected function on the second display window.

10. A computer readable medium encoded with processing instructions for implementing a data displaying method performed by a computer, the method comprising:
displaying a character message being drawn up to be transmitted on one display window;
determining whether a window division function for dividing the display window is selected; and
if the determination is that the window division function is selected:
determining what kind of function is selected,
dividing the one display window into first and second display windows,
displaying the character message to be transmitted on the first display window, and
displaying data corresponding to the selected function on the second display window.

11. The computer readable medium of claim 10, wherein the method further comprises, after the selected window division function is completed, merging the first and second display windows to reform the one display window and displaying the character message to be transmitted on the reformed one display window.

12. The computer readable medium of claim 10, wherein the method further comprises receiving another character message while the character message to be transmitted is being drawn up, the window division function comprises displaying the another character message while the character message to be transmitted is being drawn up, and the data displayed on the second display window comprises the another character message.

13. The computer readable medium of claim 12, wherein the method further comprises indicating to a user that another character message is received, and the determining that the window division function is selected comprises receiving a command to display the another character message after indicating to the user that the another character message is received.

14. The computer readable medium of claim 10, wherein the method further comprises receiving a call setup request, the window division function comprises displaying information associated with the call setup request while the character message to be transmitted is being drawn up, and the data displayed on the second display window comprises the another character message.

15. The computer readable medium of claim 14, wherein the method further comprises processing the call associated with the call setup request, and storing the character message to be transmitted while the call is processed.

16. The computer readable medium of claim 15, wherein the method further comprises, after the call is processed, merging the first and second display windows to reform the one display window and displaying the character message to be transmitted on the reformed one display window.

17. The computer readable medium of claim 10, wherein the method further comprises receiving a request to perform a function, the window division function comprises displaying information associated with the function while the character message to be transmitted is being drawn up, and the data displayed on the second display window comprises the information associated with the performance of the function.

18. The computer readable medium of claim 17, wherein the function comprises searching stored data, and the information associated with the performance of the function comprises the searched data.

19. The computer readable medium of claim 17, wherein the method further comprises, after the function is completed, merging the first and second display windows to reform the one display window and displaying the character message to be transmitted on the reformed one display window.

20. A display device comprising:
an inputting unit which receives a first character message to be transmitted;
a receiver and a transmitter to receive and transmit completed character messages;
a display having a display window; and
a controller that receives a request function while the first character message to be transmitted is being displayed, divides the display window into first and second display windows, displays on the first display window the first character message to be transmitted, and displays data corresponding to a selected function on the second display window.

21. The display device of claim 20, wherein the data corresponding to the selected function comprises one of the completed character messages.

22. The display device of claim 21, further comprising a data storage unit which stores the one of the completed character messages.

23. A display device comprising:
an inputting unit which receives a first character message to be transmitted;
a receiver and a transmitter to receive and transmit completed character messages;
a display having a display window;
a controller which, if data is to be displayed while the first character message is being received, divides the display window into first and second display windows, displays on the first display window the first character message to be transmitted, and displays the data to be displayed on the second display window; and
a data storage unit which stores the data to be displayed, wherein the receiver receives a call request, and the data to be displayed comprises identification information associated with the received call request.

24. The display device of claim 23, further comprising a speaker and a microphone through which voice data is reproduced and received, wherein the controller, if the call request is granted, establishes a call using the voice data and stores the first character message to be transmitted in the data storage unit.

25. A display device comprising:
- an inputting unit which receives a first character message to be transmitted;
- a receiver and a transmitter to receive and transmit completed character messages;
- a display having a display window;
- a controller which, if data is to be displayed while the first character message is being received, divides the display window into first and second display windows, displays on the first display window the first character message to be transmitted, and displays the data to be displayed on the second display window; and
- a data storage unit which stores the data to be displayed, wherein, when the controller receives a request to perform a function using the stored data, the controller displays information associated with the function on the second display window.

26. The display device of claim 25, wherein the function comprises searching the stored data, and, when the controller receives a request to search the stored data, the controller displays search parameters associated with the search and a search result corresponding to the searched data which corresponds to the search parameters.

* * * * *